US008782414B2

(12) United States Patent
Patiejunas

(10) Patent No.: US 8,782,414 B2
(45) Date of Patent: Jul. 15, 2014

(54) MUTUALLY AUTHENTICATED SECURE CHANNEL

(75) Inventor: Kestutis Patiejunas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1396 days.

(21) Appl. No.: 11/745,418

(22) Filed: May 7, 2007

(65) Prior Publication Data

US 2008/0282081 A1 Nov. 13, 2008

(51) Int. Cl.
*G06F 15/16* (2006.01)
*H04L 29/06* (2006.01)
*H04L 12/46* (2006.01)
*H04L 12/26* (2006.01)

(52) U.S. Cl.
CPC ............ *H04L 63/029* (2013.01); *H04L 63/164* (2013.01); *H04L 12/4633* (2013.01); *H04L 43/0811* (2013.01); *H04L 63/08* (2013.01)
USPC ................. 713/169; 713/153; 726/6; 726/12; 726/15; 709/227

(58) Field of Classification Search
CPC .............. H04L 63/0272; H04L 63/029; H04L 63/0428; H04L 63/0281; H04L 63/1441; H04L 63/164; H04L 63/08; H04L 12/4641; H04L 12/4633; H04L 12/2834; H04L 12/4625; H04L 43/0811
USPC .............. 713/153, 169, 168; 726/3, 6, 10–15; 709/219, 232, 227–229; 370/352
See application file for complete search history.

(56) References Cited

U.S. PATENT DOCUMENTS

| 5,875,394 | A | 2/1999 | Daly et al. |
|---|---|---|---|
| 6,094,485 | A * | 7/2000 | Weinstein et al. ............... 380/30 |
| 6,286,099 | B1 | 9/2001 | Kramer |
| 6,732,269 | B1 * | 5/2004 | Baskey et al. .................. 713/153 |
| 6,745,326 | B1 | 6/2004 | Wary |
| 6,785,719 | B1 | 8/2004 | Jacobson et al. |
| 6,834,271 | B1 | 12/2004 | Hodgson et al. |
| 6,988,147 | B2 * | 1/2006 | King ............................. 709/239 |
| 6,996,841 | B2 * | 2/2006 | Kadyk et al. .................... 726/12 |
| 7,003,670 | B2 * | 2/2006 | Heaven et al. ................. 713/186 |

(Continued)

FOREIGN PATENT DOCUMENTS

| WO | 0027089 A1 | 5/2000 |
|---|---|---|
| WO | 0130044 A2 | 4/2001 |

OTHER PUBLICATIONS

Dreamcss, 2012: GpToMeeting, retrieved from http://blog.dreamcss.com/tools/gotomeeting-online-meeting-andweb-conferencing-tool/.*

(Continued)

*Primary Examiner* — Catherine Thiaw
(74) *Attorney, Agent, or Firm* — Bryan Webster; Andrew Sanders; Micky Minhas

(57) ABSTRACT

A system and methods for establishing a mutually authenticated secure channel between a client device and remote device through a remote access gateway server. The remote access gateway server forwards secure connection requests and acknowledgements between the client and the remote device such that the remote access gateway does not possess any or all session keys necessary to decrypt communication between the client device and remote device.

20 Claims, 7 Drawing Sheets

(56) References Cited

U.S. PATENT DOCUMENTS

| | | | |
|---|---|---|---|
| 7,016,965 B2* | 3/2006 | Gambino | 709/229 |
| 7,146,505 B1* | 12/2006 | Harada et al. | 713/185 |
| 7,149,892 B2* | 12/2006 | Freed et al. | 713/151 |
| 7,343,398 B1* | 3/2008 | Lownsbrough | 709/218 |
| 8,533,338 B2* | 9/2013 | Sanda et al. | 709/227 |
| 2002/0078371 A1* | 6/2002 | Heilig et al. | 713/200 |
| 2002/0157019 A1* | 10/2002 | Kadyk et al. | 713/201 |
| 2003/0191843 A1* | 10/2003 | Balissat et al. | 709/227 |
| 2003/0214955 A1* | 11/2003 | Kim | 370/400 |
| 2004/0059685 A1 | 3/2004 | Sakamura et al. | |
| 2004/0073813 A1 | 4/2004 | Pinkas et al. | |
| 2004/0153569 A1* | 8/2004 | Savathphoune | 709/238 |
| 2004/0162076 A1* | 8/2004 | Chowdry et al. | 455/445 |
| 2004/0221010 A1* | 11/2004 | Butler | 709/204 |
| 2004/0236965 A1* | 11/2004 | Krohn | 713/201 |
| 2006/0005008 A1* | 1/2006 | Kao | 713/153 |
| 2006/0101510 A1* | 5/2006 | Kadyk et al. | 726/12 |
| 2006/0107036 A1* | 5/2006 | Randle et al. | 713/153 |
| 2006/0190719 A1* | 8/2006 | Rao et al. | 713/160 |
| 2006/0195895 A1* | 8/2006 | Ben-Shachar et al. | 726/11 |
| 2006/0248337 A1 | 11/2006 | Koodli | |
| 2006/0265468 A1* | 11/2006 | Iwanski et al. | 709/217 |
| 2007/0038853 A1* | 2/2007 | Day et al. | 713/153 |
| 2007/0192845 A1* | 8/2007 | Lankheim | 726/12 |
| 2008/0077693 A1* | 3/2008 | Alkiswani et al. | 709/227 |
| 2008/0082640 A1* | 4/2008 | Chang et al. | 709/220 |
| 2008/0144625 A1* | 6/2008 | Wu et al. | 370/392 |
| 2008/0270612 A1* | 10/2008 | Malakapalli et al. | 709/227 |

OTHER PUBLICATIONS

S. R. Ahuja , J. R. Ensor, S.E. Lucco "A comparison of application sharing mechanisms in real-time desktop conferencing systems", COCS '90 Proceedings of the ACM SIGOIS and IEEE CS TC-OA conference on Office Information systems, pp. 238-248, vol. 11 Issue 2-3, Apr. 1990, New York.*

Armando Fox and Steven D. Gribble 'Security on the move: indirect authentication using Kerberos', ACM, MOBICOM, Rye, NY, 1996, pp. 155-164.*

Mori "OGSA Basic Security Profile 1.0—Secure Channel", Feb. 9, 2006, pp. 1-11.

"How to disable PCT 1.0, SSL 2.0, SSL 3.0, or TLS 1.0 in Internet Information Services", http://support.microsoft.com/kb/187498, Feb. 23, 2007.

Yang et al, "Mutual Authentication Protocol for Low for Low-cost RFID " Jul. 14, 2005, pp. 1-27.

* cited by examiner

MUTUALLY AUTHENTICATED SECURE CHANNEL

BACKGROUND

Current operating systems provide functionality for a user to connect to a personal computer remotely, establish a remote access session, and interact directly with the user interface of the remote personal computer as though the user were logged in directly. To perform such functionality, the operating system receives mouse and keyboard information and sends screen updates to reflect the state of the operating system over the network connection. The network connection may be secure and/or the data sent as part of the remote desktop session may be encrypted.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and methods for establishing a mutually authenticated secure channel between a client device and remote device through a remote access gateway server. The remote access gateway server forwards secure connection requests and acknowledgements between the client and the remote device such that the remote access gateway does not possess any or all session keys necessary to decrypt communication between the client device and remote device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a mutually authenticated secure channel system, the system described is provided as an example and not a limitation. As those skilled in the art will appreciate, the present examples are suitable for application in a variety of different types of mutually authenticated secure channel system systems.

A user may own one or more personal computers and other networked devices at their home. The one or more personal computers and any other networked devices may be connected to the internet through a network switch. The network switch may include network address translation (NAT) functionality and may also implement firewall functionality to prevent unauthorized access to the one or more personal computers and any network devices from the internet.

A user may establish a remote desktop session between a client personal computer and a remote personal computer or device. The user must know the network address of the remote personal computer to which the user wishes to connect. However, if each of the user and the remote personal computer are located behind a firewall, it may be difficult or not possible for the user to discover the current network address of the remote personal computer.

A mutually authenticated secure channel system enables the user to establish and keep alive a secure connection between the remote personal computer and a remote activation gateway server. The user may then log on to another personal computer, connect to a remote activation gateway index server, and discover the remote activation gateway server to which the remote personal computer is connected. The user may then connect to the appropriate remote activation gateway server, establish a secure connection to the remote activation gateway server, and the remote activation gateway server may facilitate an encrypted channel between the user's personal computer and the remote personal computer such that any and all of the information sent may not be intercepted and read by a hacker or other unauthorized user.

While the present example mutually authenticated secure channel system is discussed in the context of remote desktop connections, it is to be appreciated that such an example mutually authenticated secure channel system may be used to facilitate a secure channel between any two networked devices for the exchange of any type of data.

Figure 1:
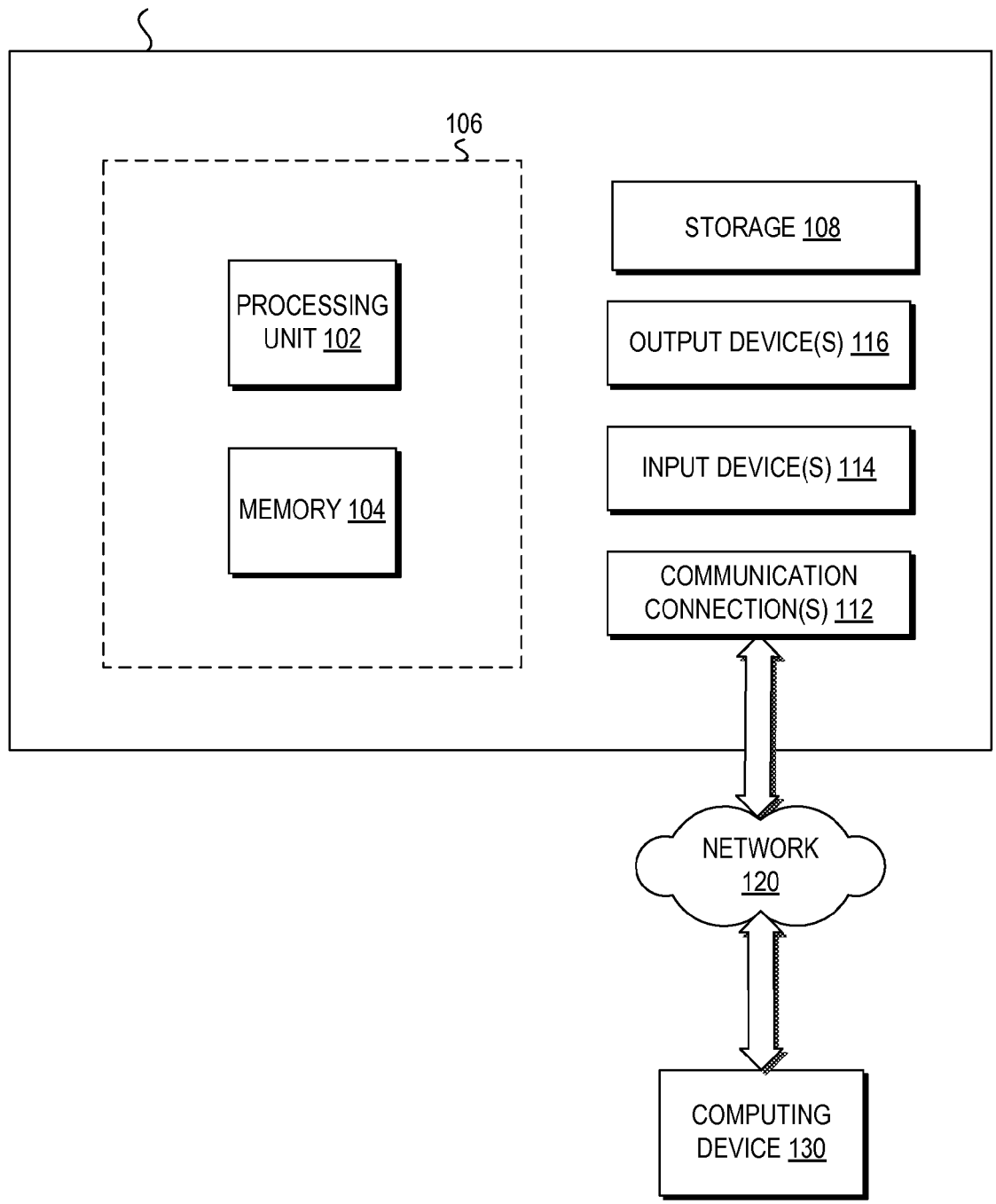
FIG. 1 shows an example of a computing device for implementing one or more embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an example of a computing device 100 for implementing one or more embodiments of the invention. In one configuration, computing device 100 includes at least one processing unit 102 and memory 104. Depending on the exact configuration and type of computing device, memory 104 may be volatile (such as RAM), non-volatile (such as ROM, flash memory, etc.) or some combination of the two. This configuration is illustrated in FIG. 1 by dashed line 106.

In other embodiments, device 100 may include additional features and/or functionality. For example, device 100 may also include additional storage (e.g., removable and/or non-removable) including, but not limited to, magnetic storage, optical storage, and the like. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 104 and storage 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also include communication connection(s) 112 that allow device 100 to communicate with other devices. Communication connection(s) 112 may include, but is not limited to, a modem, a Network Interface Card (NIC), or other interfaces for connecting computing device 100 to other computing devices. Communication connection(s) 112 may include a wired connection or a wireless connection. Communication connection(s) 112 may transmit and/or receive communication media.

Communication media typically embodies computer readable instructions or other data in a "modulated data signal" such as a carrier wave or other transport mechanism and includes any information delivery media. The term "computer readable media" may include communication media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may include input device(s) 114 such as keyboard, mouse, pen, voice input device, touch input device, infra-red cameras, video input devices, and/or any other input device. Output device(s) 116 such as one or more displays, speakers, printers, and/or any other output device may also be included in device 100. Input device(s) 114 and output device(s) 116 may be connected to device 100 via a wired connection, wireless connection, or any combination thereof. In one embodiment, an input device or an output device from another computing device may be used as input device(s) 114 or output device(s) 116 for computing device 100.

Components of computing device 100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 100 may be interconnected by a network. For example, memory 104 may be comprised of multiple physical memory units located in different physical locations interconnected by a network.

Those skilled in the art will realize that storage devices utilized to store computer readable instructions may be distributed across a network. For example, a computing device 130 accessible via network 120 may store computer readable instructions to implement one or more embodiments of the invention. Computing device 100 may access computing device 130 and download a part or all of the computer readable instructions for execution. Alternatively, computing device 100 may download pieces of the computer readable instructions, as needed, or some instructions may be executed at computing device 100 and some at computing device 130. Those skilled in the art will also realize that all or a portion of the computer readable instructions may be carried out by a dedicated circuit, such as a Digital Signal Processor (DSP), programmable logic array, and the like.

Figure 2:
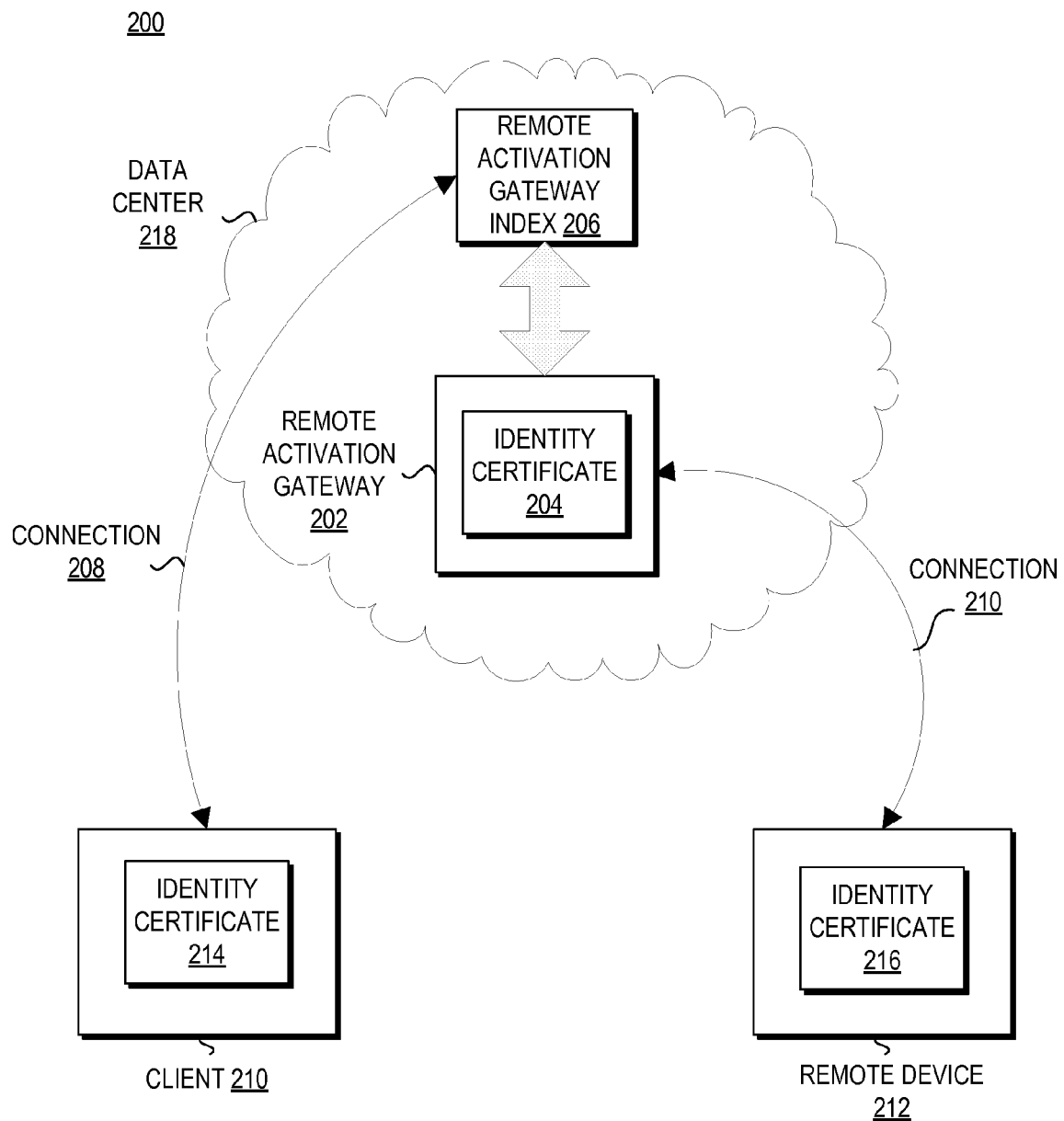
FIG. 2 shows an example of an initial state of a mutually authenticated secure channel system.

FIG. 2 shows an example initial state of an example mutually authenticated secure channel system 200. The mutually authenticated secure channel system 200 includes a remote activation gateway server 202, a remote activation gateway index server 206, a client 210, and a remote device 212. The remote activation gateway server 202 and the remote activation gateway index server 206 are included in a data center 218.

The remote activation gateway server 202 is communicatively coupled to the remote activation gateway index server 206. In this example initial state of the mutually authenticated secure channel system 200, the client 210 is communicatively coupled to the remote activation gateway index server 206 by the connection 208 and the remote device 212 is communicatively coupled to the remote activation gateway server 202 by the connection 210.

In order to establish a cryptographically strong identity, the client 210 includes a digital identity certificate 214. Similarly, the remote device 212 includes a digital identity certificate 216 and the remote activation gateway server 202 includes a digital identity certificate 204. Each of the digital identity certificates 204, 214, and 216 are cryptographic public key certificates issued by a common certificate authority. As public key certificates, each of the digital identity certificates 204, 214, and 216 include any or all of a public cryptographic key, an identifier, a validity period, the network address of a revocation center, and the digital signature of the identity certificate as generated by the certificate authority. Each of the digital identity certificates 204, 214, and 216 may be created in accordance with the Secure Sockets Layer (SSL) such that an SSL connection may be made using any or all of the digital identity certificates 204, 214, and 216.

The data center 218 represents a sub-network behind a firewall or other network security device. As such, the data center 218 may include any number of servers, such as the remote activation gateway server 202 and the remote activation gateway index server 206, but may include any number of servers providing a variety of other functions such as hypertext transport protocol (HTTP). The data center 218 may include a number of switches, routers, as well as other network security devices to forward network data from outside the sub-network to the appropriate server or other network device within the sub-network.

Each of the client 210 and the remote device 212 are personal computers and may be implemented by the example computing device 100 of FIG. 1. As previously discussed, while each of the client 210 and the remote device 212 are discussed in the context of a remote desktop session, each of the client 210 and the remote device 212 may be any type of networked device in accordance with the example computing device 100 of FIG. 1. Furthermore, each of the client 210 and remote device 212 may exchange any type of network data in addition to or instead of remote desktop session data.

The client 210 and the remote device 212 may execute software to participate in the mutually authenticated secure channel system 200. However, the functionality necessary to participate in the mutually authenticated secure channel system 200 may be included in an operating system or the like. Each of the client 210 and the remote device 212 may obtain a digital identity certificate 214 and 216, respectively, from a certificate authority to participate in the mutually authenticated secure channel system 200, e. The certificate authority verifies that the identity of the user of each of the client 210 and remote device 212 and securely issues the digital identity certificate 214 and 216, respectively, to the client 210 and the remote device 212. The certificate authority may securely issue each of the digital identity certificates 214 and 216 via an encrypted secure connection, by mailing physical digital storage including the digital identity certificate 214 and 216 to the user for installation, or any other method that ensures that the security of each of the digital identity certificates 214 and 216 is not compromised.

The remote activation gateway server 202 also includes a digital identity certificate 204 issued by the same certificate authority that issued each of the digital identity certificate 214 to the client 210 and the digital identity certificate 216 to the remote device 212. The digital identity certificate 214 may be installed on the remote activation gateway server 202 using any secure method as previously discussed. For example, the digital identity certificate 216 may simply be sent from the certificate authority to the remote activation gateway server 202 over a secure wired connection.

In preparation for establishing a mutually authenticated secure channel connection, a user of the remote device 212 connects to a registration service and registers the user's identity with the registration service. Such an identity may include any type of information including the user's name or user name, another secure type of identifier, or the like. The user may then associate the remote device 212 with the user's identity within the mutually authenticated secure channel system 200. Note that it may be at this point that the digital identity certificate 216 is issued to the remote device 212. Once the remote device 212 is registered in the mutually authenticated secure channel system 200, the identity of the user and the identity of the remote device 212 are stored in the remote activation gateway index server 206.

Similarly, the client 210 may also register with the mutually authenticated secure channel system 200. The user may then establish a match between the client 210 and the remote device 212 by associating the digital identity of the client 210, the remote device 212, and the user's identity within the mutually authenticated secure channel system 200. In associating the digital identity of the client 210, the remote device 212, and the user's identity, the user grants permission to the remote activation gateway server 202 to connect the client 210 and the remote device 212.

To begin a mutually authenticated secure channel session, the remote device 212 connects to the remote activation gateway server 202 via the connection 210 and begins sending any number of keep-alive commands to prevent the connection from timing out. Once the remote activation gateway server 202 has verified the identity of the remote device 212 and completed the connection 210 with the remote device 212, the remote activation gateway server 202 updates the entry stored at the remote activation gateway index server 206 to indicate that the remote device 212 is now connected to the remote activation gateway server 202.

The user of the client 210 may then connect to the remote activation gateway index server 206 via the connection 208. The client 210 then establishes a cryptographically strong identity with the remote activation gateway index server 206 and requests that the remote activation gateway index server 206 provide an identifier of the remote access gateway 202 to which the remote device 212 is connected.

Figure 3:
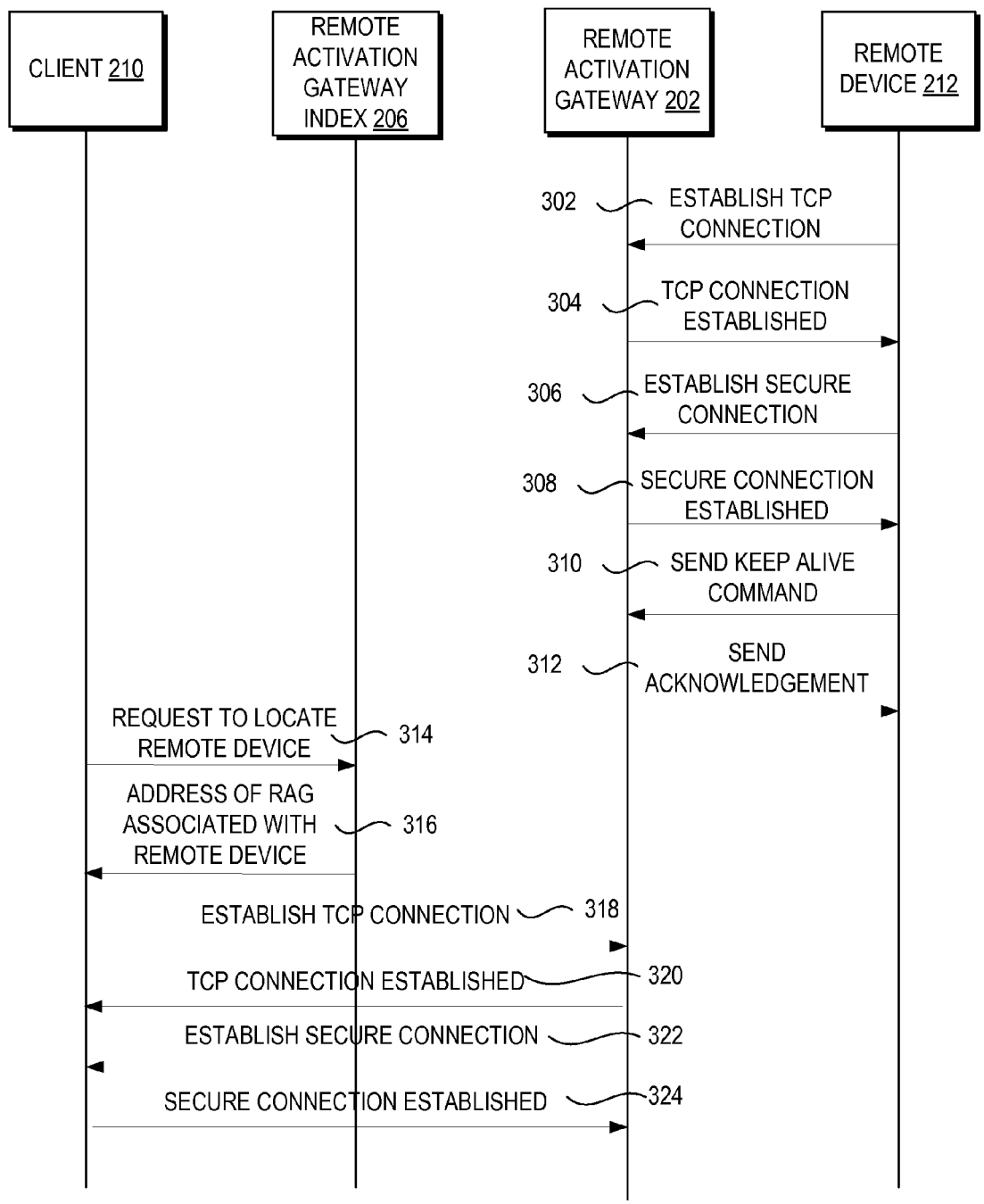
FIG. 3 shows an example data flow diagram in which a remote device establishes a secure connection with a remote access gateway and in which the client connects to a remote access gateway index to discover the identity of the remote access gateway to which the remote device is connected.

Such a process is illustrated in the flow diagram of FIG. 3.

Turning now to FIG. 3, FIG. 3 shows an example data flow diagram in which the remote device 212 (from FIG. 2) establishes a secure connection with a remote access gateway server 202 (from FIG. 2) and in which the client 210 (from FIG. 2) connects to a remote access gateway index server 206 (from FIG. 2) to discover the identity of the remote access gateway 202 to which the remote device 212 is connected. Each of the client 210, remote activation gateway index server 206, remote activation gateway 202, and remote device 212 function similarly to like numbered elements of FIG. 2 and will not be described again.

The remote device 212 may initiate a mutually authenticated secure channel by establishing a connection 302 with the remote activation gateway server 202. Such a connection may be a typical Transmission Control Protocol/Internet Protocol (TCP/IP) connection or the like. The remote activation gateway 202 responds with an acknowledgement to the remote device 212 to establish the connection.

The remote device 212 may then send a request to establish a secure connection 306 with the remote activation gateway 202. Such a secure connection may be a Secure Sockets Layer (SSL) connection or any other type of secure connection. In such a secure connection, each of the communicating entities are authenticated by an security authority and data passing over the secure connection may be encrypted.

The remote device 212 and the remote activation gateway 202 may each include a digital identity certificate for use in establishing the secure connection between the remote device 212 and the remote activation gateway server 202. Once the remote activation gateway server 202 has established the secure connection, the remote activation gateway server 202 may send a message to the remote device 212 to notify the remote device 212 that the secure connection has been established.

The remote device 212 may then send keep-alive commands 310 to the remote activation gateway server 202 to prevent the connection from timing out due to inactivity. For example, the remote device 212 may send a "ping" or other TCP/IP command to the remote activation gateway server 202 and receive an acknowledgement 312 in response.

The client 210 may then send a request 314 to the remote activation gateway index server 206 to determine the address of the remote activation gateway server 202 to which the remote device 212 is currently connected. Such a request may be made using any method; for example, a user on the client 210 may instantiate a computer application to log in to the remote activation gateway index server 206. The remote activation gateway index server 206 may then present the user with a list of all the remote devices associated with the user from which the user may select the remote device to which they wish to establish a mutually authenticated secure channel.

The remote activation gateway index server 206 may then respond 316 with the address of the remote access gateway server 202 to which the remote device 212 is connected. The client 210 may then establish a connection 318 with the remote access gateway server 202 to which the remote device 212 is connected. As has already been discussed with respect to the remote device 212, the connection may be any type of network connection. Once the network connection between the client 210 and the remote access gateway server 202 has been established, the remote access gateway server 202 may respond 320 to inform the client 210 that the connection has been established.

The client 210 may then send a request to the remote access gateway server 202 to establish a secure connection 322. As discussed with respect to the remote device 212, the secure connection may be any type of secure connection such as an SSL connection. Once the secure connection has been established, the remote activation gateway server 202 responds to the client 210 to inform the client 210 that the secure connection has been established.

Figure 4:
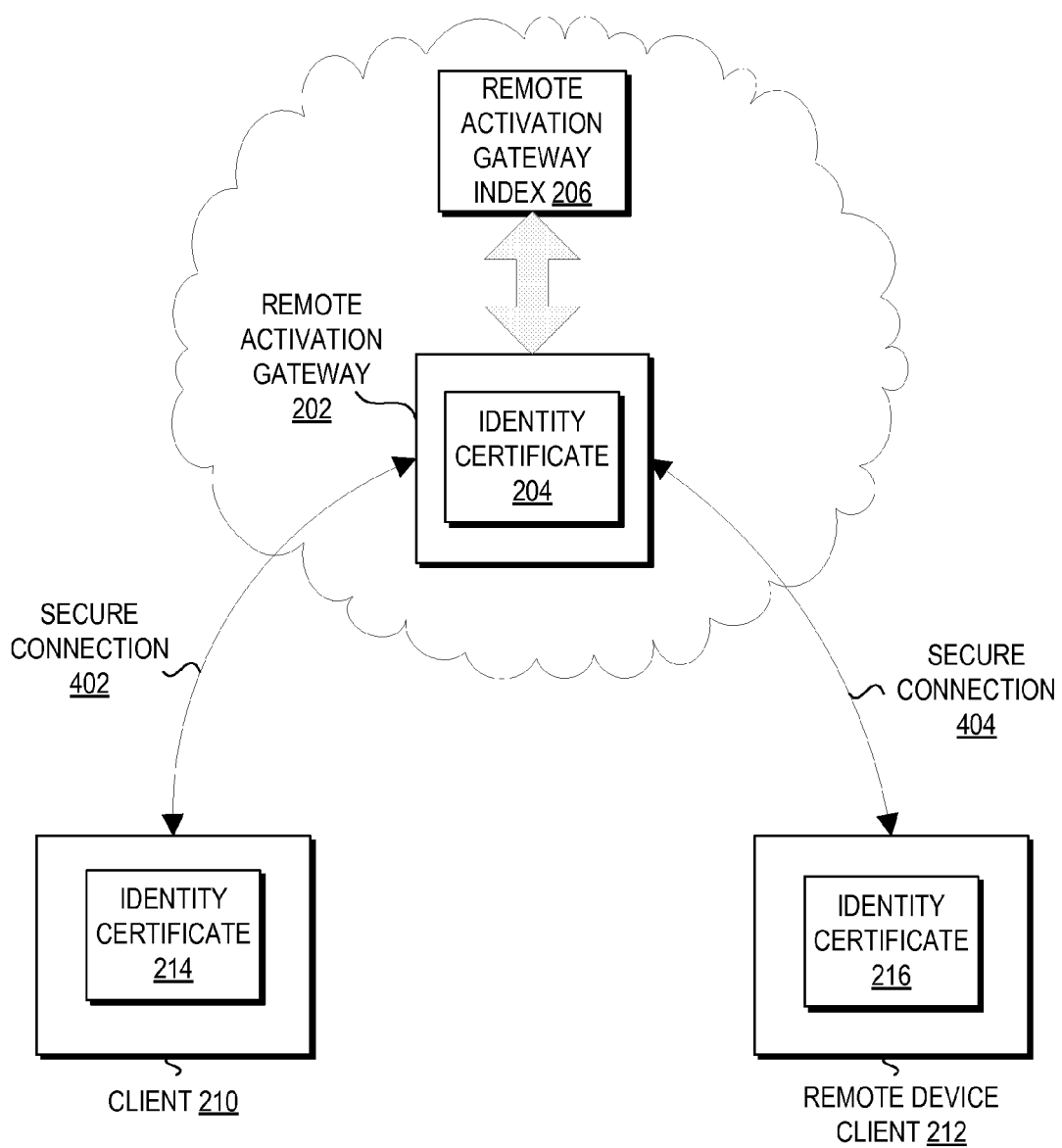
FIG. 4 shows an example state of the mutually authenticated secure channel system once the client has connected to the remote access gateway to which the remote device is also connected.

Turning now to FIG. 4, FIG. 4 shows an example state of the mutually authenticated secure channel system 200 (from FIG. 2) once the client 210 (from FIG. 2) has connected to the remote access gateway 202 (from FIG. 2) to which the remote device 212 (from FIG. 2) is also connected. Each of the client 210, remote activation gateway index server 206, remote activation gateway 202, and remote device 212 function similarly to like numbered elements of FIG. 2 and will not be described again.

After the example flow of FIG. 3 has been performed, the client 210 is connected to the remote activation gateway server 202 via a secure connection 402. As discussed in the discussion of FIG. 3, the secure connection may be any type of secure network connection such as Secure Sockets Layer (SSL) connection. Accordingly, the remote device 212 is also connected to the remote activation gateway server 202 by a secure connection 404.

Figure 5:
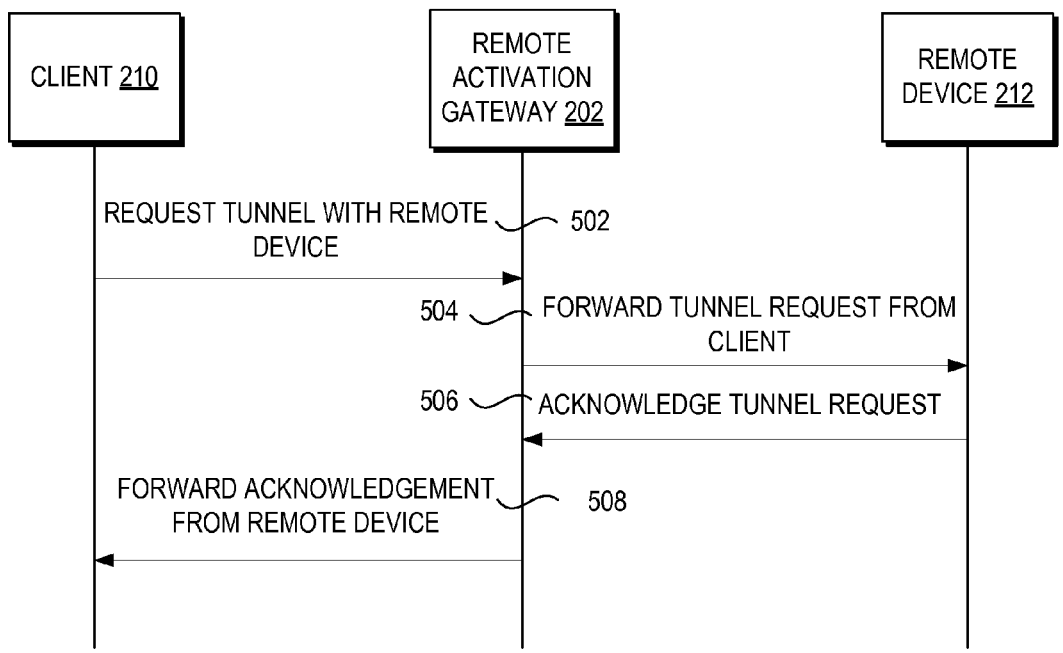
FIG. 5 shows an example data flow diagram in which the client requests a mutually authenticated secure tunnel to the remote device.

Turning now to FIG. 5, FIG. 5 shows an example data flow diagram in which the client 210 (from FIG. 2) sends a request for a mutually authenticated secure tunnel between the client 210 (from FIG. 2) and the remote device 212 (from FIG. 2) to the remote activation gateway 202 (from FIG. 2). Each of the client 210, remote activation gateway 202, and remote device 212 function similarly to like numbered elements of FIG. 2 and will not be described again.

The client 210 may send a request 502 to establish a mutually authenticated secure tunnel with the remote device 212 to the remote activation gateway server 202. Such a request may be made using any method, and for the purposes of discussion it may be assumed that such a request is made using a predetermined protocol shared by the client 210, the remote activation gateway server 202, and the remote client 212.

At this point, the remote activation gateway server 202 may establish the cryptographically strong identity of each of the client 210 and the remote device 212. Such an establishment may be made via the use of a digital identity certificate on each of the client 210 and the remote device 212. In response to a positive establishment of the cryptographically strong identities of each of the client 210 and the remote device 212, the remote activation gateway server 212 allows communication between the client 210 and the remote device 212.

The remote activation gateway server 212 forwards 504 the request 502 to the remote device 212. The remote device 212 may acknowledge or respond 506 affirmatively or negatively to the request 504. Accordingly, the remote activation gateway server 202 forwards 508 the response or acknowledgement 506 to the client 210.

Figure 6:
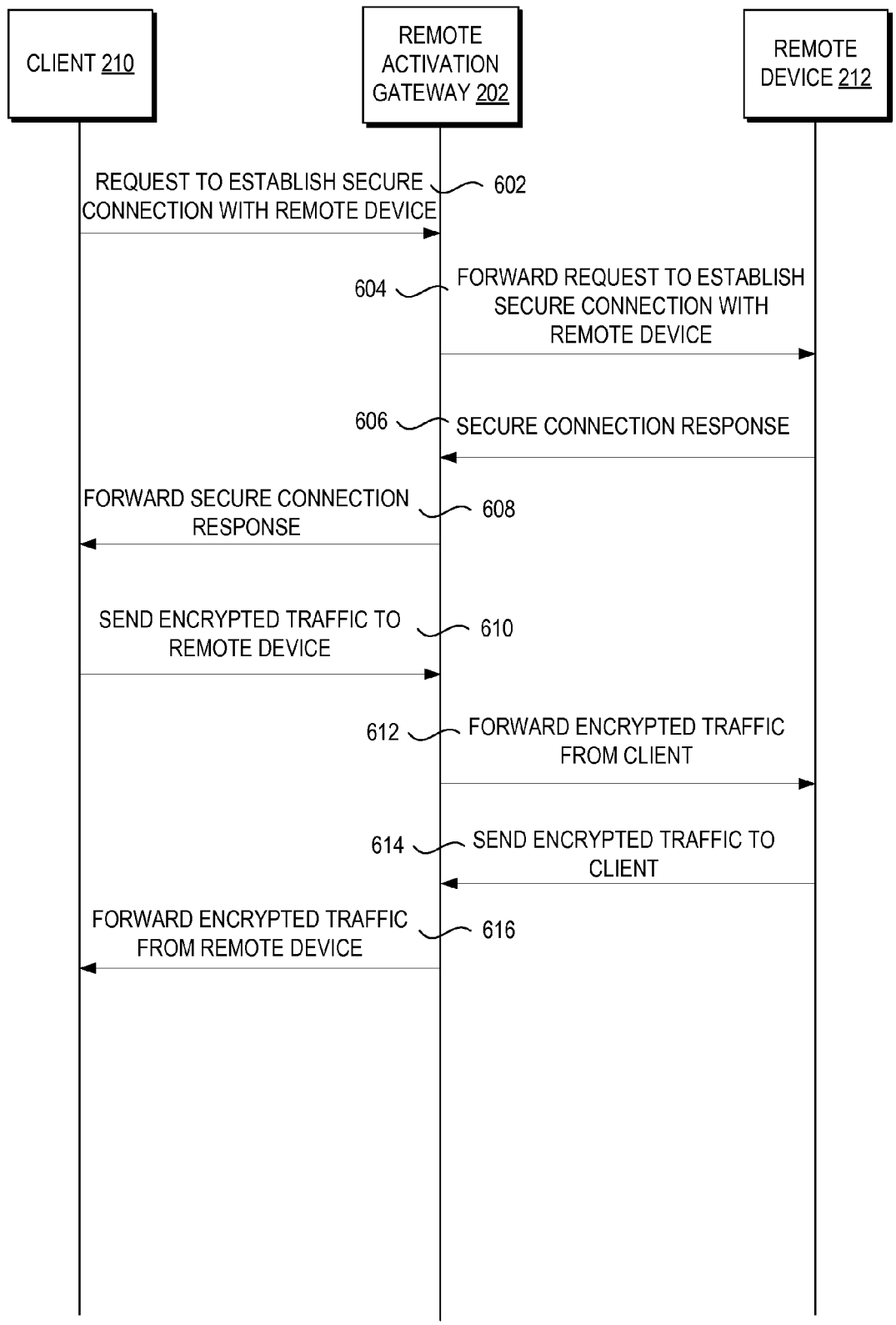
FIG. 6 shows an example data flow diagram in which the remote access gateway establishes the mutually authenticated secure tunnel and forwards encrypted data between the client and the remote device.

FIG. 6 shows an example data flow diagram in which the remote access gateway 202 (from FIG. 2) establishes the mutually authenticated secure tunnel and forwards encrypted data between the client 210 (from FIG. 2) and the remote device 212 (from FIG. 2). Each of the client 210, remote activation gateway 202, and remote device 212 function similarly to like numbered elements of FIG. 2 and will not be described again.

To establish the mutually authenticated secure channel, the client 210 sends a request 602 to the remote activation gateway server 202 to establish the mutually authenticated secure channel with the remote device 212. As the remote activation gateway server 202 has established the cryptographically strong identity of each of the client 210 and the remote device 212, the remote activation gateway 202 may forward 604 the request for the secure channel from the client 210 to the remote device 212. The request 602 may include any security information, for example, a session key, necessary to create a cryptographically secure connection between the client 210 and the remote device 212.

At this point, the remote device 212 may also create any cryptographic session key necessary to create a secure connection with the client 210 and send a response 606 to the remote activation gateway server 202. The remote activation gateway server 202 forwards the secure connection response 606 from the remote device 212 to the client 210. Once the response 608 is received by the client 210, a cryptographically secure connection is established between the client 210 and the remote device 212 and any communication between the client 210 and the remote device 212 may be decrypted only by the client 210 and the remote device 212.

The client 210 may then send 610 encrypted traffic, such as request to establish a remote desktop connection or other remote desktop data, to the remote activation gateway server 202. The remote activation gateway server 202 does not possess the session key necessary to decrypt the encrypted traffic and forwards 612 the encrypted traffic to the remote device 212.

Similarly, the remote device 212 may send encrypted traffic 614, such as graphical screen updates as part of a remote desktop session, to the remote activation gateway server 202. As previously discussed, the remote activation gateway server 202 does not possess the session key necessary to decrypt the encrypted traffic and forwards the encrypted traffic 616 to the client 210.

Figure 7:
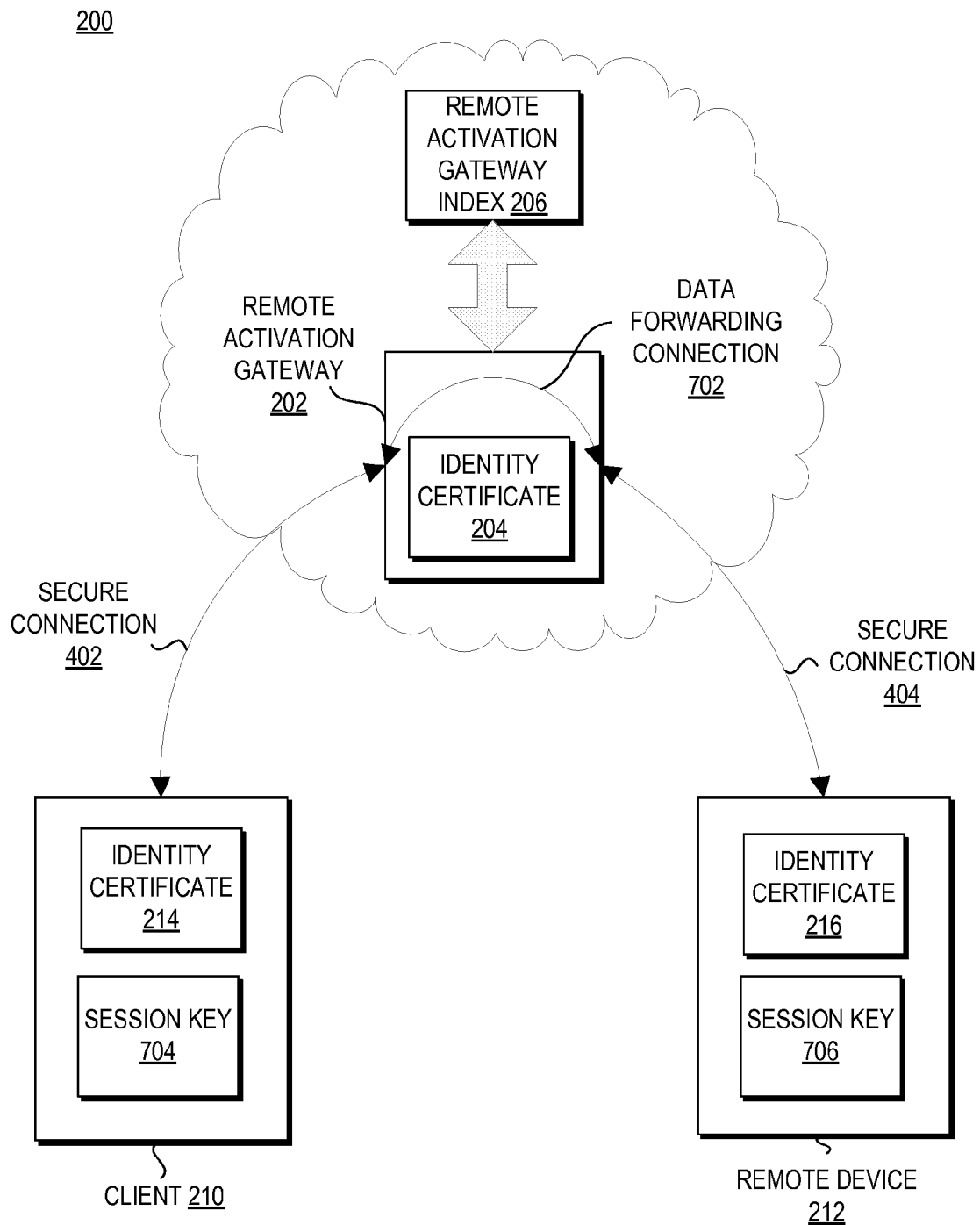
FIG. 7 shows an example state of the mutually authenticated secure channel system once the mutually authenticated secure channel has been established between the client and the remote device.

FIG. 7 shows an example state of the mutually authenticated secure channel system 200 (from FIG. 2) once the mutually authenticated secure channel has been established between the client 210 (from FIG. 2) and the remote device 212 (from FIG. 2). Each of the client 210, remote activation gateway index server 206, remote activation gateway 202, and remote device 212 function similarly to like numbered elements of FIG. 2 and will not be described again.

As discussed in the discussion of FIG. 6, the client 210 includes a session key 704 to encrypt and decrypt data traffic sent to and received from the remote client 212. Similarly, the remote device 212 includes a session key 706 to encrypt and decrypt data traffic sent to and received from the client 212. Such a session key 704 and session key 706 may any type of secure encryption key, for example, a Secure Sockets Layer (SSL) session key.

Also as discussed in the discussion of FIG. 6, the remote activation gateway server 202 forwards encrypted data traffic between the client 210 and the remote device 212 over the data forwarding connection 702. The remote activation gateway server 202 does not include the session key necessary to decrypt the encrypted data traffic between the client 210 and the remote device 212 and therefore may not view or capture any communication between the client 210 and the remote device 212.

The invention claimed is:

1. One or more device-readable storage media, the one or more device-readable storage media storing device-executable instructions for performing a method comprising:
   receiving, at a remote access gateway server, a request from a remote device to establish a first secure connection;
   forwarding an acknowledgment to the remote device to establish the first secure connection;
   establishing the first secure connection from the remote device to the remote access gateway server such that the remote device can accept remote access requests only through the remote access gateway server;
   after establishing the first secure connection, receiving, at the remote access gateway server, a request from a client to establish a second secure connection with the remote device;
   forwarding the request to establish the second secure connection to the remote device;
   receiving a response to the request to establish the second secure connection from the remote device;
   forwarding the response to the request to establish the second secure connection to the client;
   establishing the second secure connection from the client to the remote device;
   receiving, in response to the establishing the second secure connection, encrypted data traffic from the client, wherein the remote access gateway server does not possess a key required to decrypt the encrypted data; and
   forwarding the encrypted data traffic from the client to the remote device.

2. The one or more device-readable storage media storing device-executable instructions of claim 1, the method further comprising:
   receiving encrypted data traffic from the remote device, the encrypted data traffic being decryptable by only the client and the remote device; and
   forwarding encrypted data traffic from the remote device to the client.

3. The one or more device-readable storage media storing device-executable instructions of claim 1, the method further comprising:
   receiving a request from the client to create an encrypted tunnel between the client and the remote device;
   matching a cryptographically strong identity of the client and a cryptographically strong identity of the remote device;
   forwarding the request to create an encrypted tunnel between the client and the remote device in response to positively matching the cryptographically strong identity of the client and the cryptographically strong identity of the remote device; and
   forwarding encrypted data traffic from the client and the remote device, without decrypting the encrypted data traffic, in order to create the encrypted tunnel between the client and the remote device.

4. The one or more device-readable storage media storing device-executable instructions of claim 1, the method further comprising:
   receiving a request from the client to establish a network connection; and
   establishing a network connection with the client in response to verifying a cryptographically strong identity of the client.

5. The one or more device-readable storage media storing device-executable instructions of claim 1, the method further comprising:
   receiving a request from the remote device to establish a network connection;
   establishing the network connection with the remote device in response to verifying a cryptographically strong identity of the remote device.

6. The one or more device-readable storage media storing device-executable instructions of claim 1, the method further comprising:
   receiving a keep alive command from the remote device; and
   sending an acknowledgement of the keep alive command to the remote device.

7. The one or more device-readable storage media storing device-executable instructions of claim 1, wherein the client is connected from behind a firewall.

8. The one or more device-readable storage media storing device-executable instructions of claim 1, wherein the remote device is connected from behind a firewall.

9. The one or more device-readable storage media storing device-executable instructions of claim 1, wherein the client has been redirected from a remote access gateway index server.

10. The one or more device-readable storage media storing device-executable instructions of claim 1, wherein the encrypted data traffic comprises remote desktop commands.

11. A system, comprising:
   a client for sending and receiving a first stream of encrypted data, the first stream of encrypted data including remote desktop commands formed by the client based on user input from one or more input devices;
   a remote device for sending and receiving a second stream of encrypted data, the second stream of encrypted data including screen update data usable by the client to update a screen in response to the user input from one of more input devices; and
   a remote access gateway server, for establishing a cryptographically strong identity of the client, establishing a cryptographically strong identity of the remote device, receiving a request from the remote device to establish a first secure connection with the remote device, after establishing the first secure connection with the remote device, receiving a request from the client to establish a second secure connection with the remote device, establishing a second secure connection from the client to the remote device, and for forwarding the encrypted data sent from the client to the remote device and from the remote device to the client, wherein the remote access gateway server does not possess a key required to decrypt the encrypted data after the secure connection from the client to the remote device has been established, and wherein the remote device can accept remote access requests only through the remote access gateway server during the second secure connection.

12. The system of claim 11, further comprising a remote access gateway index server, for storing an identifier of the remote access gateway server and for receiving a query from the client to locate the remote access gateway server to which the remote device is connected.

13. The system of claim 11, wherein the remote access gateway server is further for establishing a secure sockets layer (SSL) connection to the client.

14. The system of claim 11, wherein the remote access gateway server is further for establishing a secure sockets layer (SSL) connection to the remote device.

15. The system of claim 11, wherein the client includes a digital certificate signed by a digital security authority.

16. The system of claim 11, wherein the remote device includes a digital certificate signed by a digital security authority.

17. The system of claim 11, wherein the first stream of encrypted data is encrypted with a secure sockets layer (SSL) session key.

18. The system of claim 11, wherein the second stream of encrypted data is encrypted with a secure sockets layer (SSL) session key.

19. A method, comprising:
receiving, at a remote access gateway server, a request from a remote device to establish a secure sockets layer (SSL) connection;
forwarding an acknowledgment to the remote device to establish the secure
sockets layer (SSL) connection;
establishing the secure sockets layer (SSL) connection with the remote device such that the remote device can accept remote access requests only through the remote access gateway server;
after establishing the secure sockets layer (SSL) connection, receiving, at the remote access gateway server, a request from a client to establish a remote desktop session with the remote device;
matching a cryptographically strong identity of the client with a cryptographically strong identity of the remote device;
forwarding a secure sockets layer (SSL) session establishment command from the client to the remote device;
forwarding a secure sockets layer (SSL) response from the remote device to the client; and
forwarding, between the client and the remote device, remote desktop session data encrypted with a secure sockets layer (SSL) cryptographic session key, the remote desktop session data including remote desktop commands based on one or more of keyboard or mouse data input at the client, the remote desktop data further including screen update data from the remote device and usable by the client to update a screen at the client in response to the keyboard or mouse input data, wherein the remote access gateway server does not possess a key required to decrypt the encrypted data after a secure sockets layer (SSL) session has been established.

20. The method of claim 19, wherein the encrypted data is forwarded asynchronously between the client and the remote device.

* * * * *